United States Patent
Matsumoto et al.

(10) Patent No.: US 11,268,198 B2
(45) Date of Patent: Mar. 8, 2022

(54) SYNTHESIS GAS PRODUCTION SYSTEM

(71) Applicant: Chiyoda Corporation, Yokohama (JP)

(72) Inventors: Jun Matsumoto, Yokohama (JP); Dai Takeda, Yokohama (JP)

(73) Assignee: CHIYODA CORPORATION, Kanagawa (JP)

( * ) Notice: Subject to any disclaimer, the term of this patent is extended or adjusted under 35 U.S.C. 154(b) by 265 days.

(21) Appl. No.: 16/643,858

(22) PCT Filed: Jun. 27, 2018

(86) PCT No.: PCT/JP2018/024393
§ 371 (c)(1),
(2) Date: Mar. 3, 2020

(87) PCT Pub. No.: WO2019/049476
PCT Pub. Date: Mar. 14, 2019

(65) Prior Publication Data
US 2021/0002775 A1    Jan. 7, 2021

(30) Foreign Application Priority Data
Sep. 5, 2017 (JP) .............................. JP2017-169984

(51) Int. Cl.
*C25B 1/04* (2021.01)
*C25B 9/73* (2021.01)
(Continued)

(52) U.S. Cl.
CPC ............ *C25B 1/23* (2021.01); *B01D 53/1475* (2013.01); *B01D 53/18* (2013.01); *C25B 1/04* (2013.01);
(Continued)

(58) Field of Classification Search
CPC ......... C25B 15/023; C25B 15/02; C25B 1/00; C25B 1/04; C25B 1/23; C25B 1/50; C25B 15/08; C25B 15/087
See application file for complete search history.

(56) References Cited

U.S. PATENT DOCUMENTS 10,119,196 B2    11/2018  Sivasankar et al.
2018/0274114 A1*  9/2018  Ono .......................... C25B 1/04

FOREIGN PATENT DOCUMENTS

| JP | 2013532774 A | 8/2013 |
| JP | 2013253279 A | 12/2013 |

(Continued)

OTHER PUBLICATIONS

English translation of International Search Report for International Application No. PCT/JP2018/024393, dated Sep. 4, 2018, 2 pages.

*Primary Examiner* — Nicholas A Smith
(74) *Attorney, Agent, or Firm* — Armstrong Teasdale LLP

(57) ABSTRACT

A synthesis gas production system for producing CO and $H_2$ by electrolyzing an aqueous solution containing $CO_2$ includes: an electrolysis device including an anode chamber and a cathode chamber separated by a separator membrane; a cathode-side circulation line connected to the cathode chamber to circulate a cathode solution containing $CO_2$; a catalyst supply device provided in the cathode-side circulation line to supply a CO production catalyst to the cathode solution; and a gas composition detection device configured to measure a ratio between CO and $H_2$ in a production gas produced in the cathode chamber. At least one of control of a supply amount of the CO production catalyst by the catalyst supply device and control of a voltage applied between the anode and the cathode by the electrolysis device is performed to make a ratio of $H_2$ to CO in the production gas be within a predetermined target range.

17 Claims, 5 Drawing Sheets

(51) Int. Cl.
*C25B 9/19* (2021.01)
*B01D 53/14* (2006.01)
*B01D 53/18* (2006.01)
*C25B 15/02* (2021.01)
*C25B 15/08* (2006.01)
*C25B 1/23* (2021.01)
*C25B 11/087* (2021.01)

(52) U.S. Cl.
CPC .................. *C25B 9/19* (2021.01); *C25B 9/73* (2021.01); *C25B 11/087* (2021.01); *C25B 15/02* (2013.01); *C25B 15/08* (2013.01)

(56) References Cited

FOREIGN PATENT DOCUMENTS

| | | |
|---|---|---|
| WO | 2012077199 A1 | 6/2012 |
| WO | 2012137344 A1 | 10/2012 |
| WO | 2016124611 A1 | 8/2016 |

* cited by examiner

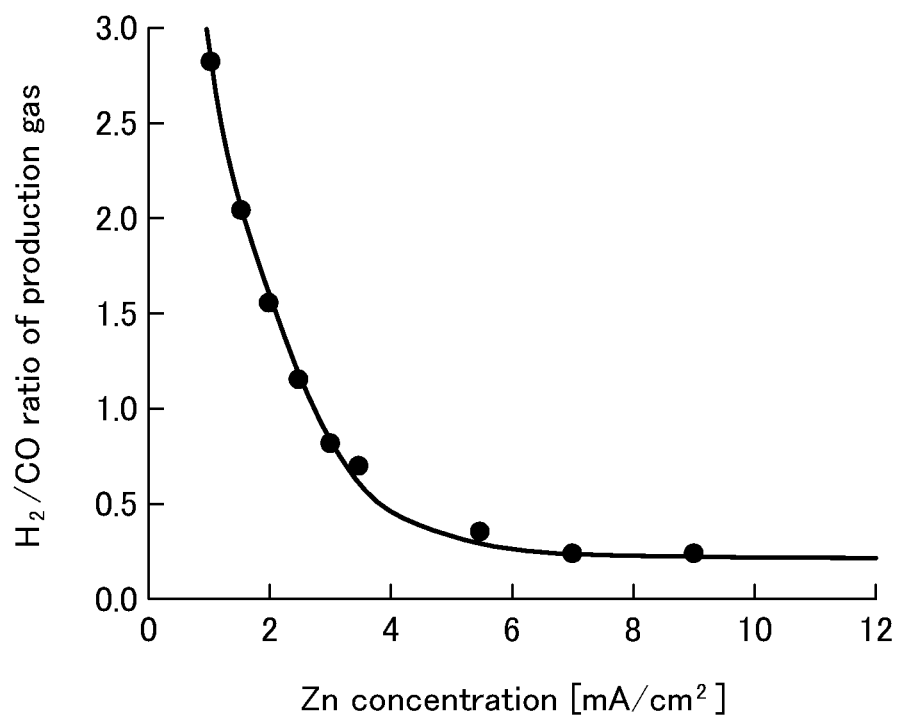

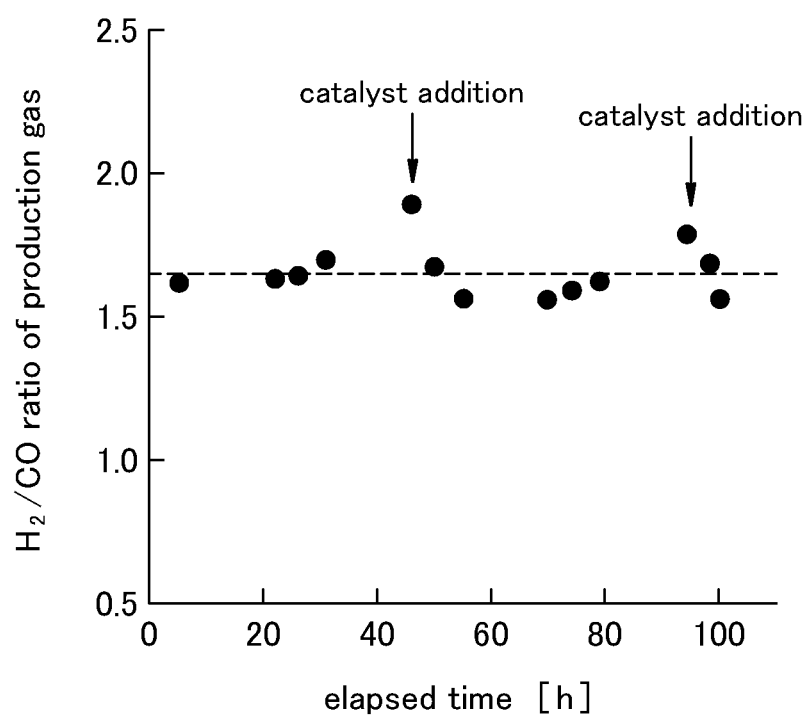

SYNTHESIS GAS PRODUCTION SYSTEM

CROSS-REFERENCE TO RELATED APPLICATIONS

This application is a U.S. National Phase Application of PCT/JP2018/024393, filed Jun. 27, 2018, which claims the benefit of priority to JP Application No. 2017169984, filed Sep. 5, 2017, the contents of which are hereby expressly incorporated by reference in their entirety.

TECHNICAL FIELD

The present invention relates to a synthesis gas production system for producing carbon monoxide and hydrogen by electrolyzing an aqueous solution containing carbon dioxide.

BACKGROUND ART

A synthesis gas production system for producing carbon monoxide and hydrogen by electrolyzing carbon dioxide is known (for example, Patent Document 1). The synthesis gas production system includes an electrolysis device having an anode and a cathode, and a carbon dioxide absorption tank for making an electrolytic solution absorb carbon dioxide. In this synthesis gas production system, carbon dioxide and water are reduced at the cathode to produce carbon monoxide and hydrogen, and water is electrolyzed at the anode to produce oxygen.

The carbon monoxide and hydrogen produced at the cathode are used as reactants in the Fischer-Tropsch reaction (FT reaction) or the like. In the synthesis gas production system described in Patent Document 1 mentioned above, to improve the efficiency of the FT reaction, the concentration of carbon dioxide dissolved in the electrolytic solution is controlled, whereby the mole ratio of carbon monoxide to hydrogen is ½.

PRIOR ART DOCUMENT(S)

Patent Document(s)

Patent Document 1: JP2013-253279A

SUMMARY OF THE INVENTION

Task to be Accomplished by the Invention

There is a problem that it is difficult to control the carbon dioxide concentration in the electrolytic solution in a well-responsive manner. Therefore, it is preferred that the synthesis gas production system includes means for adjusting the mole ratio between hydrogen and carbon monoxide to be produced besides the means for adjusting the carbon dioxide concentration in the electrolytic solution.

In view of the above background, an object of the present invention is to control the ratio between hydrogen and carbon monoxide to be produced in a synthesis gas production system.

Means to Accomplish the Task

To achieve the above object, one aspect of the present invention provides a synthesis gas production system (1) for producing CO and $H_2$ by electrolyzing an aqueous solution containing $CO_2$, comprising: an electrolysis device (6) including an anode chamber (4) having an anode (15), a cathode chamber (5) having a cathode (16), and a separator membrane (3) separating the anode chamber and the cathode chamber; a cathode-side circulation line (8) connected to the cathode chamber to circulate a cathode solution containing $CO_2$; a catalyst supply device (29) provided in the cathode-side circulation line to supply a CO production catalyst to the cathode solution; and a gas composition detection device (35) configured to measure a ratio between CO and $H_2$ in a production gas produced in the cathode chamber, wherein based on a result of the gas composition detection device, at least one of control of a supply amount of the CO production catalyst by the catalyst supply device and control of a voltage applied between the anode and the cathode by the electrolysis device is performed to make a ratio of $H_2$ to CO in the production gas be within a predetermined target range.

According to this aspect, the ratio of $H_2$ to CO in the production gas can be within the predetermined target range. When the amount of the CO production catalyst is increased, the production amount of CO increases, and hence, the ratio of $H_2$ to CO in the production gas decreases. On the other hand, when the voltage applied to the electrolysis device is increased, the current density increases and the production amount of $H_2$ increases, whereby the ratio of $H_2$ to CO in the production gas increases.

In the above aspect, preferably, the synthesis gas production system further comprises: a bypass line provided in parallel with the cathode-side circulation line and having an upstream end and a downstream end connected to the cathode-side circulation line; a flow rate control valve configured to control a flow rate of the cathode solution flowing through the bypass line; and a solid-liquid separation device provided in the bypass line.

According to this configuration, in a case where the CO production catalyst is water-insoluble, it is possible to remove the CO production catalyst from the cathode solution by controlling the flow rate control valve to supply the cathode solution to the solid-liquid separation device. Namely, it is possible to reduce the amount of the CO production catalyst in the cathode solution. This allows the ratio of $H_2$ to CO in the production gas to increase. Also, in a case where the CO production catalyst is water-soluble in an initial state and is water-insoluble in a deactivated state, the deactivated catalyst can be recovered from the cathode solution.

Another aspect of the present invention provides a synthesis gas production system (1) for producing CO and $H_2$ by electrolyzing an aqueous solution containing $CO_2$, comprising: an electrolysis device (6) including an anode chamber (4) having an anode (15), a cathode chamber (5) having a cathode (16), and a separator membrane (3) separating the anode chamber and the cathode chamber; a cathode-side circulation line (8) connected to the cathode chamber to circulate a cathode solution containing $CO_2$; a catalyst supply device (29) provided in the cathode-side circulation line to supply a CO production catalyst to the cathode solution; a gas composition detection device (35) configured to measure a ratio between CO and $H_2$ in a production gas produced in the cathode chamber; a bypass line (31) provided in parallel with the cathode-side circulation line and having an upstream end and a downstream end connected to the cathode-side circulation line; a flow rate control valve (26) configured to control a flow rate of the cathode solution flowing through the bypass line; and a solid-liquid separation device (37) provided in the bypass line, wherein based on a result of the gas composition detection device, at least one of control of a supply amount of the CO production catalyst by the catalyst supply device, control of a flow rate of the cathode solution supplied to the solid-liquid separation device by the flow rate control valve, and control of a voltage applied between the anode and the cathode by the electrolysis device is performed to make a ratio of $H_2$ to CO in the production gas be within a predetermined target range.

According to this configuration, the ratio of $H_2$ to CO in the production gas can be within the predetermined target range. When the amount of the CO production catalyst is increased, the production amount of CO increases, and hence, the ratio of $H_2$ to CO in the production gas decreases. On the other hand, when the voltage applied to the electrolysis device is increased, the current density increases and the production amount of $H_2$ increases, whereby the ratio of $H_2$ to CO in the production gas increases. In a case where the CO production catalyst is water-insoluble, it is possible to remove the CO production catalyst from the cathode solution by controlling the flow rate control valve to supply the cathode solution to the solid-liquid separation device. Namely, it is possible to reduce the amount of the CO production catalyst in the cathode solution. This allows the ratio of $H_2$ to CO in the production gas to increase. Also, in a case where the CO production catalyst is water-soluble in an initial state and is water-insoluble in a deactivated state, the deactivated catalyst can be recovered from the cathode solution.

In the above aspect, preferably, the target range is set to be greater than or equal to 0.25 and less than or equal to 2.5 for a mole ratio of $H_2$ to CO.

According to this configuration, the reaction efficiency can be improved when various types of organic synthesis reaction such as the FT reaction are performed using the produced CO and $H_2$.

In the above aspect, preferably, the CO production catalyst is supplied to the cathode solution in a state of at least one of powder, aqueous solution, and suspension.

According to this aspect, the CO production catalyst can be added to the cathode solution easily.

In the above aspect, preferably, the CO production catalyst includes at least one of a group consisting of Zn, ZnO, $ZnO_2$, $ZnO_3$, $ZnSO_4$, $Zn(NO_3)_2$, $ZnCl_2$, $ZnBr_2$, $ZnI_2$, $Zn(OCOCH_3)_2$, Ag, AgO, $Ag_2O$, $Ag_2O_3$, $AgNO_3$, AgCl, AgBr, $Ag(OCOCH_3)$, Au, AuCl, $AuCl_3$, $H[AuCl_4]$, $AuBr_3$, $H[AuBr_4]$, $Au(OCOCH_3)$, and $Au(OCOCH_3)_3$.

In the above aspect, preferably, the cathode solution includes at least one of a group consisting of LiOH, NaOH, KOH, $Li_2CO_3$, $Na_2CO_3$, $K_2CO_3$, $LiHCO_3$, $NaHCO_3$, and $KHCO_3$.

In the above aspect, preferably, the synthesis gas production system further comprising a carbon dioxide absorption tank (30) provided in the cathode-side circulation line and configured to cause gaseous $CO_2$ to contact the cathode solution and to make the cathode solution absorb the $CO_2$. Also, in the above aspect, preferably, the synthesis gas production system further comprises a gas-liquid separation device (25) provided in the cathode-side circulation line and configured to separate the production gas and the cathode solution. Moreover, in the above aspect, preferably, the synthesis gas production system further comprises an anode-side circulation line (7) connected to the anode chamber independently of the cathode-side circulation line to circulate an anode solution.

According to these aspects, it is possible to configure the synthesis gas production system as a recycling system.

Effect of the Invention

According to the foregoing aspects, it is possible to control the ratio between hydrogen and carbon monoxide to be produced in a synthesis gas production system.

BRIEF DESCRIPTION OF THE DRAWINGS

FIG. 4 is a graph showing a relationship between a concentration of CO production catalyst and the $H_2$/CO ratio in the production gas;
and
FIG. 5 is a graph showing a temporal change of the $H_2$/CO ratio in the production gas.

MODES FOR CARRYING OUT THE INVENTION

In the following, a synthesis gas production system according to the present invention will be described. A synthesis gas production system 1 according to an embodiment is configured to electrically reduce (electrolyze) an aqueous solution containing carbon dioxide to produce a synthesis gas containing carbon monoxide and hydrogen.

Figure 1:
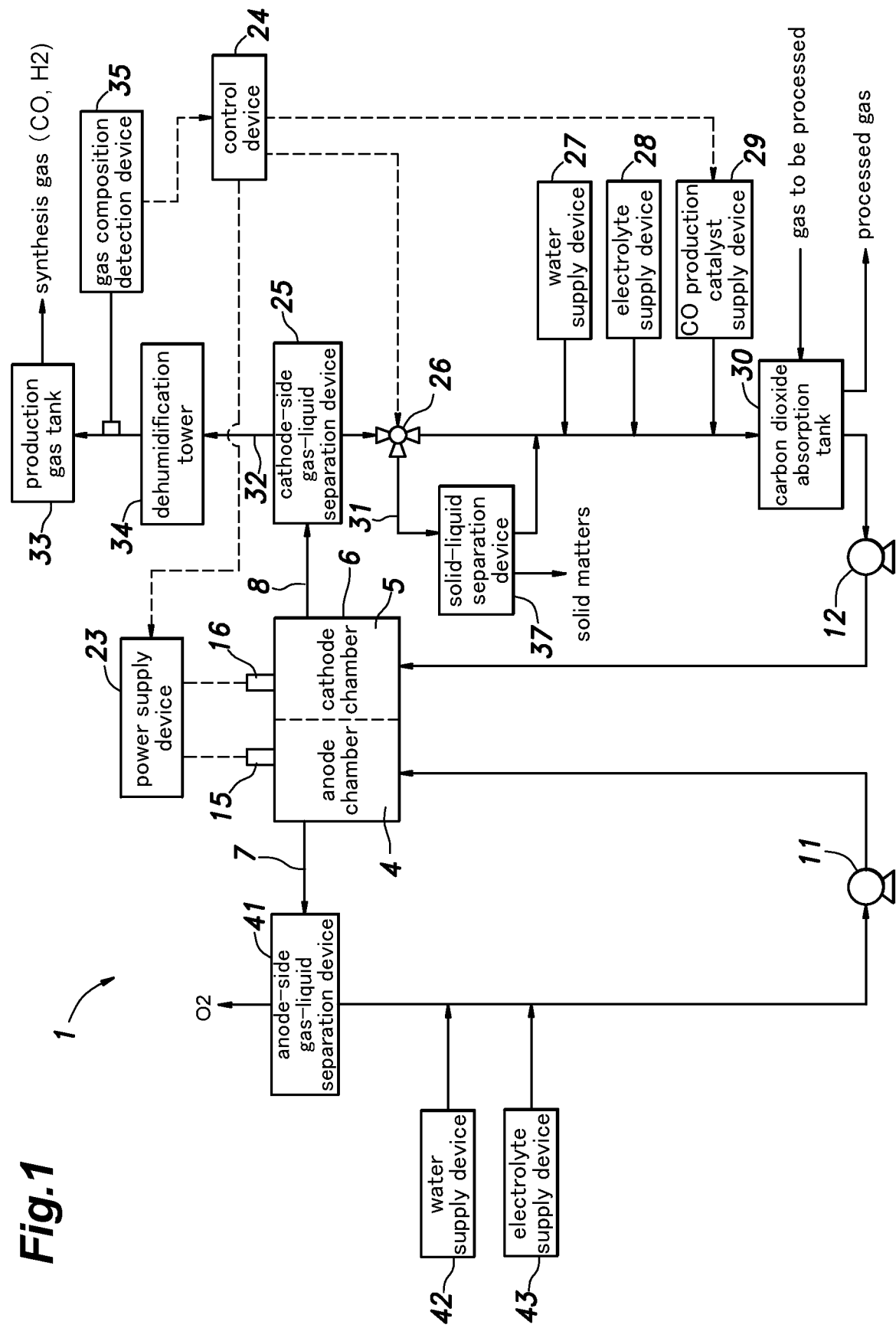
FIG. 1 is a schematic diagram of a synthesis gas production system according to an embodiment.

As shown in FIG. 1, the synthesis gas production system 1 includes an electrolysis device 6 having an anode chamber 4 and a cathode chamber 5 separated by a separator membrane 3, an anode-side circulation line 7 connected to the anode chamber 4 to circulate an anode solution, and a cathode-side circulation line 8 connected to the cathode chamber 5 to circulate a cathode solution containing carbon dioxide. The anode-side circulation line 7 and the cathode-side circulation line 8 are passages formed of piping and are independent from each other.

The anode solution is an aqueous solution supplied to the anode chamber 4 and the cathode solution is an aqueous solution supplied to the cathode chamber 5. The anode solution is an aqueous solution containing an electrolyte. The cathode solution is an aqueous solution containing an electrolyte, a CO production catalyst, and carbon dioxide. In the cathode solution, the electrolyte and carbon dioxide are dissolved in water. In the cathode solution, the CO production catalyst may be dissolved in water or suspended in water. The electrolyte contained in the anode solution and the cathode solution includes at least one of potassium, sodium, lithium, and a compound thereof. The electrolyte preferably includes at least one of a group consisting of LiOH, NaOH, KOH, $Li_2CO_3$, $Na_2CO_3$, $K_2CO_3$, $LiHCO_3$, $NaHCO_3$, and $KHCO_3$, for example.

The CO production catalyst is a catalyst known as a carbon dioxide reduction catalyst and includes at least one of Zn, Ag, and Au. Specifically, the CO production catalyst preferably includes at least one of a group consisting of Zn, ZnO, $ZnO_2$, $ZnO_3$, $ZnSO_4$, $Zn(NO_3)_2$, $ZnCl_2$, $ZnBr_2$, $ZnI_2$, $Zn(OCOCH_3)_2$, Ag, AgO, $Ag_2O$, $Ag_2O_3$, $AgNO_3$, AgCl, AgBr, $Ag(OCOCH_3)$, Au, AuCl, $AuCl_3$, $H[AuCl_4]$, $AuBr_3$, $H[AuBr_4]$, $Au(OCOCH_3)$, and $Au(OCOCH_3)_3$. The CO production catalyst is preferably water-soluble but may be water-insoluble.

The anode-side circulation line 7 is provided with an anode-side liquid feed pump 11, and the cathode-side circulation line 8 is provided with a cathode-side liquid feed pump 12. The anode-side liquid feed pump 11 causes the anode solution to circulate through the anode chamber 4 and the anode-side circulation line 7, and the cathode-side liquid feed pump 12 causes the cathode solution to circulate through the cathode chamber 5 and the cathode-side circulation line 8.

Figure 2:
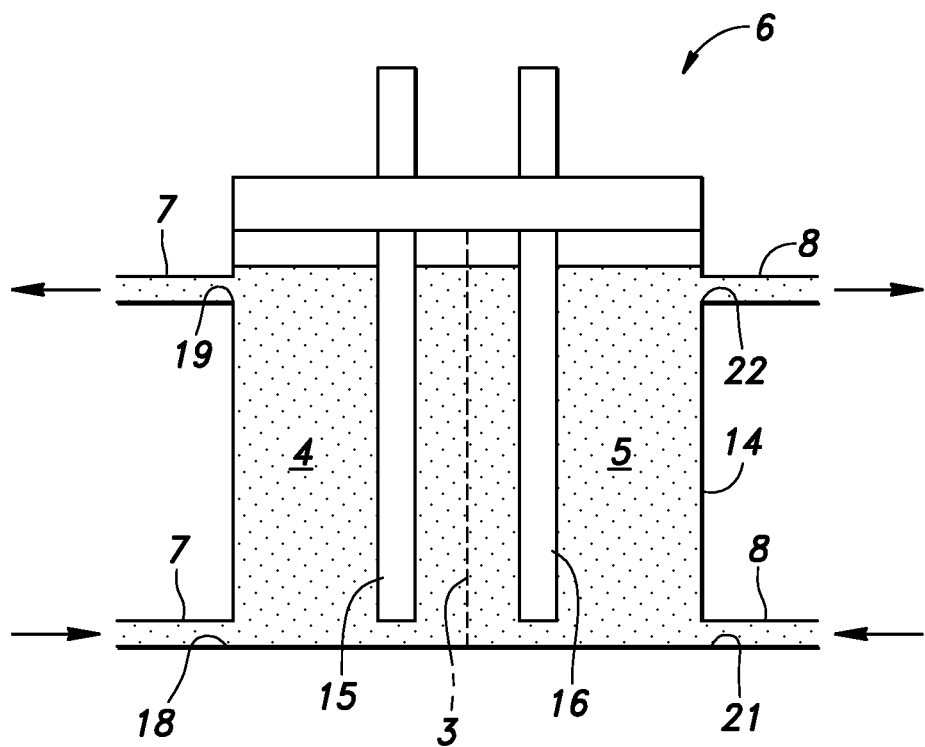
FIG. 2 is a schematic diagram showing an electrolysis device.

FIG. 2 is a schematic diagram of the electrolysis device 6. As shown in FIG. 2, the electrolysis device 6 includes an electrolysis tank 14 serving as a container, a separator membrane 3 separating an interior of the electrolysis tank 14 into the anode chamber 4 and the cathode chamber 5, an anode 15 (electrode) disposed in the anode chamber 4, and a cathode 16 (electrode) disposed in the cathode chamber 5. The electrolysis tank 14 has an anode solution inlet 18 and an anode solution outlet 19 connected to the anode chamber 4 and a cathode solution inlet 21 and a cathode solution outlet 22 connected to the cathode chamber 5. The anode solution inlet 18 and the cathode solution inlet 21 are arranged in a lower part of the electrolysis tank 14 while the anode solution outlet 19 and the cathode solution outlet 22 are arranged in an upper part of the electrolysis tank 14. The anode solution inlet 18 and the anode solution outlet 19 are connected to the anode-side circulation line 7 while the cathode solution inlet 21 and the cathode solution outlet 22 are connected to the cathode-side circulation line 8.

The separator membrane 3 is formed of an ion exchange membrane including an anion exchange membrane or a cation exchange membrane. The ion exchange membrane is preferably selected depending on the kind of the electrolyte contained in the anode solution and the cathode solution. For instance, the anion exchange membrane preferably is a membrane through which at least one of hydroxide ion, carbonate ion, and hydrogencarbonate ion can pass, and the cation exchange membrane preferably is a membrane through which at least one of hydrogen ion, potassium ion, sodium ion, and lithium ion can pass.

The anode 15 and the cathode 16 are made of metal material such as platinum, gold, silver, copper, iron, lead, etc., for example, metal alloy material thereof, carbon-based material such as carbon, or conductive ceramic. The shape of the anode 15 and the cathode 16 may be a flat plate, a flat plate provided with multiple openings, a mesh, or a porous body. The shape of the openings formed in the flat plate may be circular, rhombus, star, etc. The flat plate may be formed to have a waveform or to be curved or may have irregularities on the surface.

The anode 15 is connected to a positive electrode of a power supply device 23, and the cathode 16 is connected to a negative electrode of the power supply device 23. The power supply device 23 is capable of changing the voltage applied between the anode 15 and the multiple cathodes 16. The power supply device 23 changes the applied voltage in accordance with a signal received from a control device 24. For example, the power supply device 23 applies a voltage suitable for electrolysis of the aqueous solution (for instance, a voltage that makes the current density equal to or lower than 800 $mA/cm^2$ and makes the reaction temperature in the electrolysis tank 14 be in the range of 20 to 80 degrees Celsius) between the anode 15 and the multiple cathodes 16. By the application of voltage between the cathode 16 and the anode 15, carbon dioxide is reduced at the cathode 16 to produce carbon monoxide and hydrogen, and the anode solution is electrolyzed at the anode 15 to produce oxygen.

The electrolysis device 6 preferably includes multiple sets of the anode chamber 4 provided with the anode 15 and the cathode chamber 5 provided with the cathode 16. The anode chambers 4 and the cathode chambers 5 forming the sets are preferably connected in parallel with each other.

As shown in FIG. 1, in the cathode-side circulation line 8, a cathode-side gas-liquid separation device 25, a switching valve 26, a water supply device 27, an electrolyte supply device 28, a CO production catalyst supply device 29, and a carbon dioxide absorption tank 30 are arranged in the described order from the cathode solution outlet 22 of the cathode chamber 5 in the circulation direction of the cathode solution. The cathode-side liquid feed pump 12 is provided in the cathode-side circulation line 8 at a position between the carbon dioxide absorption tank 30 and an end part connected to the cathode solution inlet 21 of the electrolysis device 6 and feeds the cathode solution toward the cathode solution inlet 21.

The cathode-side gas-liquid separation device 25 separates a gas component contained in the cathode solution that has passed through the cathode chamber 5 from the cathode solution. The cathode-side gas-liquid separation device 25 may be a known knockout drum, for example. The gas separated at the cathode-side gas-liquid separation device 25 contains hydrogen and carbon monoxide produced at the cathode 16.

The switching valve 26 is provided at a connection between the cathode-side circulation line 8 and an upstream end of a bypass line 31. The bypass line 31 is provided in parallel with the cathode-side circulation line 8, and the upstream end and the downstream end thereof are connected to a section of the cathode-side circulation line 8 between the cathode-side gas-liquid separation device 25 and the water supply device 27. The switching valve 26 functions as a flow rate control valve configured to control the flow rate of the cathode solution flowing through the bypass line 31. The switching valve 26 is an electric valve whose opening degree is controlled by the control device 24. In the present embodiment, the switching valve 26 is configured as a three-way valve capable of adjusting an amount of cathode solution directed to the bypass line 31. In another embodiment, a flow rate control valve may be provided in the bypass line 31 instead of the switching valve 26 (three-way valve).

A solid-liquid separation device 37 is provided in the bypass line 31. The solid-liquid separation device 37 is configured to separate solids (solid matters) contained in the cathode solution. The solid-liquid separation device 37 may be a filtration device or a centrifuge, for example. In a case where the CO production catalyst is water-insoluble, the solid-liquid separation device 37 separates the CO production catalyst from the cathode solution. In a case where the CO production catalyst is water-soluble in an initial state and is water-insoluble in a deactivated state, the solid-liquid separation device 37 separates the deactivated CO production catalyst from the cathode solution.

The water supply device 27 supplies water to the cathode-side circulation line 8. The water supply device 27 preferably controls the amount of water supply based on the liquid volume of the cathode solution detected by a liquid level sensor (not shown in the drawings) such that the liquid volume of the cathode solution is within a target range.

The electrolyte supply device 28 supplies the electrolyte to the cathode-side circulation line 8. The electrolyte supply device 28 preferably controls the supply amount of electrolyte based on the electric conductivity of the cathode solution detected by a conductivity meter (not shown in the drawings) such that the electric conductivity of the cathode solution is within a target range. The electrolyte supply device 28 supplies the electrolyte to the cathode-side circulation line 8 in a state of aqueous solution or powder.

The CO production catalyst supply device 29 supplies the CO production catalyst to the cathode-side circulation line 8. The CO production catalyst supply device 29 preferably changes the supply amount of the CO production catalyst based on a signal received from the control device 24. The CO production catalyst supply device 29 supplies the CO production catalyst to the cathode-side circulation line 8 in a state of aqueous solution, suspension, or powder.

The carbon dioxide absorption tank 30 internally causes a gas to be processed containing carbon dioxide to contact the liquid cathode solution so that the carbon dioxide is absorbed in the cathode solution. The carbon dioxide absorption tank 30 internally includes piping for supplying the gas to be processed and a sprayer for spraying the cathode solution from the ceiling side. The carbon dioxide absorption tank 30 may include a temperature control device configured to control the temperature of the inside cathode solution. The gas to be processed is a combustion exhaust gas produced when a hydrocarbon fuel is combusted, for example.

The production gas, which is a gas separated at the cathode-side gas-liquid separation device 25, is sent to a production gas tank 33 through a production gas line 32. The production gas line 32 is provided with a dehumidification tower 34 and a gas composition detection device 35 in this order from the cathode-side gas-liquid separation device 25.

The dehumidification tower 34 removes moisture from the production gas by causing the production gas to contact an absorption liquid, such as triethylene glycol, monoethylene glycol or the like, or an absorbent, such as a molecular sieve, silica gel, or the like.

The gas composition detection device 35 continuously detects the composition of the production gas from which moisture has been removed. The gas composition detection device 35 samples part of the production gas from a part of the production gas line 32 between the dehumidification tower 34 and the production gas tank 33 and detects the composition thereof. The gas composition detection device detects carbon monoxide and hydrogen and obtains a mole ratio of hydrogen to carbon monoxide (hereinafter referred to as a $H_2/CO$ ratio) in the production gas. The gas composition device may be a gas chromatography device, for example. The gas composition detection device outputs a signal in accordance with the detected $H_2/CO$ ratio. By continuously monitoring the $H_2/CO$ ratio, it is possible to estimate the state and amount of the CO production catalyst.

The control device 24 controls at least one of the power supply device 23 and the CO production catalyst supply device 29 based on the signal from the gas composition detection device 35 such that the $H_2/CO$ ratio is within a target range. The target range is set to be greater than or equal to 0.25 and less than or equal to 2.5, for example. Preferably, the target range is set to be greater than or equal to 1.5 and less than or equal to 2.5.

The control device 24 is capable of changing the $H_2/CO$ ratio by changing the voltage applied by the power supply device 23. When the applied voltage is increased, the current density between the anode 15 and the cathode 16 increases. The increase in the current density promotes the hydrogen production reaction, and hence, increases the production amount of hydrogen relative to the production amount of carbon monoxide. Accordingly, the $H_2/CO$ ratio increases.

The control device 24 is capable of changing the $H_2/CO$ ratio by changing the amount of CO production catalyst supplied by the CO production catalyst supply device 29. When the supply amount of the CO production catalyst is increased, the concentration of the CO production catalyst in the cathode solution increases. The increase in the concentration of the CO production catalyst promotes the carbon monoxide production reaction, and hence, increases the production amount of carbon monoxide relative to the production amount of hydrogen. Accordingly, the $H_2/CO$ ratio decreases.

In the anode-side circulation line 7, an anode-side gas-liquid separation device 41, a water supply device 42, and an electrolyte supply device 43 are arranged in the described order from the anode solution outlet 19 of the anode chamber 4 in the circulation direction of the anode solution. The anode-side liquid feed pump 11 is provided in the anode-side circulation line 7 at a position between the electrolyte supply device 43 and an end part connected to the anode solution inlet 18 of the electrolysis device 6 and feeds the anode solution toward the anode solution inlet 18.

The anode-side gas-liquid separation device 41 separates a gas component contained in the anode solution that has passed through the anode chamber 4 from the anode solution. The anode-side gas-liquid separation device 41 may be a known knockout drum, for example. The gas separated at the anode-side gas-liquid separation device 41 contains oxygen produced at the anode 15.

The water supply device 42 supplies water to the anode-side circulation line 7. The water supply device 42 preferably controls the supply amount of water based on the liquid volume of the anode solution detected by a liquid level sensor (not shown in the drawings) such that the liquid volume of the anode solution is within a target range.

The electrolyte supply device 43 supplies the electrolyte to the anode-side circulation line 7. The electrolyte supply device 43 preferably controls the supply amount of electrolyte based on the electric conductivity of the anode solution detected by a conductivity meter (not shown in the drawings) such that the electric conductivity of the anode solution is within a target range. The electrolyte supply device 43 supplies the electrolyte to the anode-side circulation line 7 in a state of aqueous solution or powder.

In the following, description will be made of an operation of the synthesis gas production system 1 and a method of manufacturing a synthesis gas using the synthesis gas production system 1. In the synthesis gas production system 1, the cathode solution is caused to circulate through the cathode chamber 5 and the cathode-side circulation line 8 by the cathode-side liquid feed pump 12, and the anode solution is caused to circulate through the anode chamber 4 and the anode-side circulation line 7 by the anode-side liquid feed pump 11.

In the electrolysis device 6, carbon dioxide and hydrogen in the cathode solution are reduced in the cathode chamber 5 to produce carbon monoxide and hydrogen, and the water in the anode solution is oxidized in the anode chamber 4 to produce oxygen (electrolysis process).

The cathode solution that has passed through the cathode chamber 5 is forwarded to the cathode-side gas-liquid separation device 25, where the production gas containing carbon monoxide and hydrogen is separated from the cathode solution (production gas separation process). The separated production gas is stored in the production gas tank 33 after moisture is removed therefrom at the dehumidification tower 34 (dehumidification process). A part of the production gas is sampled before being forwarded to the production gas tank 33, and the composition of the production gas is detected by the gas composition detection device 35 (component detection process).

To the cathode solution that has passed through the solid-liquid separation device 37, the water is supplied by the water supply device 27 (water supply process), the electrolyte is supplied by the electrolyte supply device 28 (electrolyte supply process), and the CO production catalyst is supplied by the CO production catalyst supply device 29 (CO production catalyst supply process).

The cathode solution that has passed through the CO production catalyst supply device 29 absorbs carbon dioxide at the carbon dioxide absorption tank 30 (carbon dioxide absorption process), and is forwarded to the cathode chamber 5 again.

Also, with the control of the switching valve 26, part of the cathode solution that has passed through the cathode-side gas-liquid separation device 25 flows to the bypass line 31 and solid matters are removed therefrom at the solid-liquid separation device 37 (solid matter remove process). The solid matters include the water-insoluble CO production catalyst and the CO production catalyst that has been deactivated and deposited. Thereby, part of the CO production catalyst is recovered from the cathode solution. The recovered CO production catalyst is preferably reused after being subjected to a regeneration process.

The control device 24 controls at least one of the power supply device 23, the CO production catalyst supply device 29, and the switching valve 26 based on the $H_2/CO$ ratio to maintain the $H_2/CO$ ratio within the target range (composition control process). When the $H_2/CO$ ratio detected by the gas composition detection device 35 is less than the target range, the power supply device 23 increases the applied voltage to increase $H_2/CO$ ratio. On the other hand, when the $H_2/CO$ ratio detected by the gas composition detection device 35 is greater than the target range, the CO production catalyst supply device 29 increases the CO production catalyst concentration in the cathode solution by supplying the CO production catalyst, thereby to decrease the $H_2/CO$ ratio. Also, when the $H_2/CO$ ratio detected by the gas composition detection device 35 is less than the target range, the switching valve 26 increases the flow rate of the cathode solution flowing through the bypass line 31 and the solid-liquid separation device 37 to decrease the CO production catalyst concentration in the cathode solution, whereby the $H_2/CO$ ratio is increased. In the case where the CO production catalyst is water-insoluble, if the flow rate of the cathode solution flowing to the bypass line 31 increases, the amount of CO production catalyst removed from the cathode solution at the solid-liquid separation device 37 increases. As a result, the CO production catalyst concentration in the cathode solution decreases, and the $H_2/CO$ ratio increases.

The anode solution that has passed through the anode chamber 4 is forwarded to the anode-side gas-liquid separation device 41, where a gas containing oxygen is removed from the anode solution (oxygen separation process).

The gas containing carbon monoxide and hydrogen stored in the production gas tank 33 is supplied as reactants to an organic substance synthesis device based on the FT reaction or the like, for example. In the FT reaction, organic substances such as methane, ethylene, methanol, ethanol, propanol, allyl alcohol such as 2-propen-1-ol, formic acid, acetic acid, and so on are produced by using carbon monoxide and hydrogen as reactants.

As described above, the synthesis gas production system 1 is a recycling system in which the cathode solution and the anode solution circulate, and can be operated continuously.

The synthesis gas production system 1 monitors the $H_2/CO$ ratio of the production gas and controls at least one of the power supply device 23 and the CO production catalyst supply device 29 to maintain the $H_2/CO$ ratio within the predetermined target range. As a result, even when deactivation of the CO production catalyst, fluctuation of the carbon dioxide concentration in the cathode solution, evaporation of water, replenishment of water, fluctuation of the electrolyte concentration, or the like occurs continuously due to the continuous operation of the synthesis gas production system 1, the $H_2/CO$ ratio in the production gas is maintained within the predetermined target range.

The synthesis gas production system 1 can produce the production gas with a constant $H_2/CO$ ratio. Therefore, by maintaining the $H_2/CO$ ratio of the production gas to be greater than or equal to 0.25 and less than or equal to 2.5, more preferably, greater than or equal to 1.5 and less than or equal to 2.5, it is possible to make the production gas have a composition ratio suitable for the reactants of the FT reaction. As a result, the efficiency of the FT reaction can be improved.

(Experiment 1)

In Experiment 1, influence of the current density between the anode and the cathode in the electrolysis device on the $H_2/CO$ ratio of the production gas was confirmed. The electrolysis device used includes a container, an anion exchange membrane separating the inner chamber of the container into an anode chamber and a cathode chamber, an anode consisting of a platinum mesh electrode placed in the anode chamber, and a cathode consisting of a graphite electrode placed in the cathode chamber. The anode chamber and the cathode chamber were filled with an aqueous solution containing $KHCO_3$ as the electrolyte and $Zn(OCOCH_3)_2$ as the CO production catalyst. The aqueous solution was always subjected to bubbling of carbon dioxide gas to saturate the carbon dioxide concentration in the aqueous solution. The applied voltage was adjusted such that the current density between the anode and the cathode became a predetermined value of 5 to 40 $mA/cm^2$, and the constant current was made to flow for 30 minutes. During this, the temperature of the aqueous solution was maintained at 25 degrees Celsius. After 30 minutes from the start of application of the voltage, the production gas in the anode chamber was collected and composition analysis was performed by gas chromatography.

Figure 3:
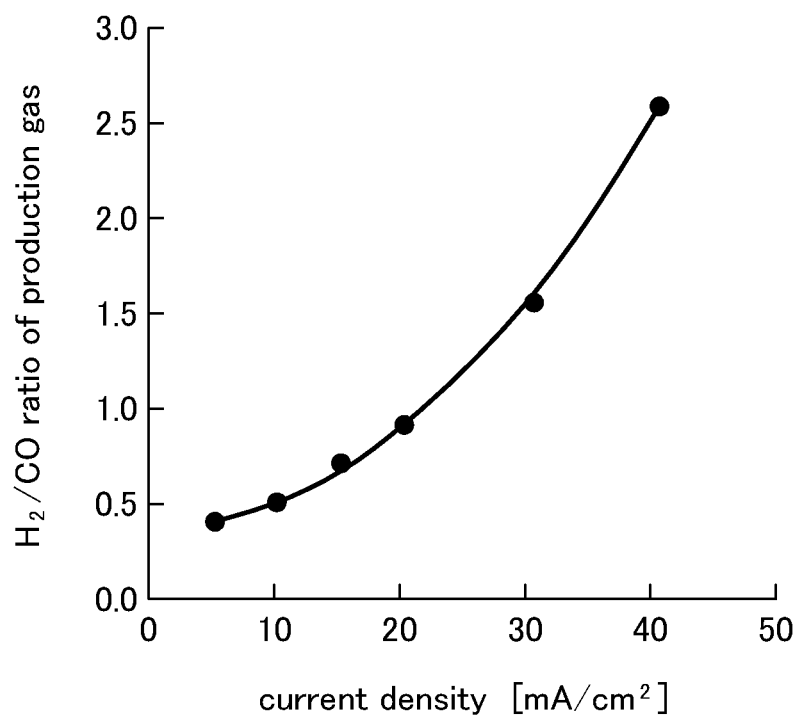
FIG. 3 is a graph showing a relationship of a $H_2$/CO ratio in a production gas to a current density between a cathode and an anode.

FIG. 3 is a result of Experiment 1 and specifically is a graph showing a relationship between the current density and $H_2/CO$ ratio in the production gas. From the result shown in FIG. 3, it was confirmed that the $H_2/CO$ ratio increases when the current density increases. The increase in the current density promotes the production of hydrogen and carbon monoxide. However, because the production of carbon monoxide is limited by the amount of CO production catalyst, the amount of increase of hydrogen in the product exceeds the amount of increase of carbon monoxide. As a result, the $H_2/CO$ ratio increases. From the result of Experiment 1, it can be understood that the $H_2/CO$ ratio in the production gas can be changed by changing the current density (applied voltage) between the anode and the cathode.

(Experiment 2)

In Experiment 2, influence of the concentration of the CO production catalyst on the $H_2/CO$ ratio of the production gas was confirmed. The electrolysis device used is the same as in Experiment 1. The anode chamber and the cathode chamber were filled with an aqueous solution containing $KHCO_3$ as the electrolyte and $Zn(OCOCH_3)_2$ as the CO production catalyst. The aqueous solution was prepared in plural with varied concentrations of $Zn(OCOCH_3)$. The aqueous solution was always subjected to bubbling of carbon dioxide gas to saturate the carbon dioxide concentration in the aqueous solution. The applied voltage was adjusted such that the current density between the anode and the cathode became a predetermined value of 5 mA/cm², and the constant current was made to flow for 30 minutes. During this, the temperature of the aqueous solution was maintained at 25 degrees Celsius. After 30 minutes from the start of application of the voltage, the production gas in the anode chamber was collected and composition analysis was performed by gas chromatography.

FIG. 4 is a result of Experiment 2 and specifically is a graph showing a relationship between the concentration of the CO production catalyst and the $H_2/CO$ ratio in the production gas. Here, the concentration of the CO production catalyst is represented as an amount of Zn (mg) per surface area of the anode (cm²). From the result shown in FIG. 4, it was confirmed that the $H_2/CO$ ratio decreases when the concentration of the CO production catalyst increases. This is attributed to the fact that the production amount of carbon monoxide increases with an increase in the concentration of the CO production catalyst. When the concentration of the CO production catalyst is greater than or equal to 7 mg/cm², the $H_2/CO$ ratio becomes substantially constant at about 0.25. From the result of Experiment 2, it can be understood that the $H_2/CO$ ratio in the production gas can be changed by changing the concentration (amount of addition) of the CO production catalyst.

(Experiment 3)

In Experiment 3, a temporal change of the $H_2/CO$ ratio of the production gas was confirmed. The electrolysis device used is the same as in Experiment 1. The anode chamber and the cathode chamber were filled with an aqueous solution containing $KHCO_3$ as the electrolyte and $ZnCO_3$ as the CO production catalyst. The aqueous solution was always subjected to bubbling of carbon dioxide gas to saturate the carbon dioxide concentration in the aqueous solution. The applied voltage was adjusted such that the current density between the anode and the cathode became a predetermined value of 30 mA/cm², and the constant current was made to flow for 100 hours. During this, the temperature of the aqueous solution was maintained at 25 degrees Celsius. The production gas in the anode chamber was collected at arbitrary times, and composition analysis was performed by gas chromatography. Also, $ZnCO_3$ was added to the aqueous solution when the result of the composition analysis showed that the $H_2/CO$ ratio became greater than or equal to 1.8.

FIG. 5 is a result of Experiment 3 and specifically is a graph showing a relationship between the elapsed time and the $H_2/CO$ ratio in the production gas. From the result shown in FIG. 5, it is found that the $H_2/CO$ ratio increases with the lapse of time. This is attributed to the deactivation of the CO production catalyst and the decrease in the production amount of carbon monoxide. It was also confirmed that by adding the CO production catalyst when the $H_2/CO$ ratio increases, the $H_2/CO$ ratio can be lowered. This is attributed to the fact that the addition of the CO production catalyst increases the production amount of carbon monoxide. From the result of Experiment 3, it can be understood that the $H_2/CO$ ratio in the production gas can be changed by changing the concentration (amount of addition) of the CO production catalyst.

Glossary

1: synthesis gas production system
3: separator membrane
4: anode chamber
5: cathode chamber
6: electrolysis device
7: anode-side circulation line
8: cathode-side circulation line
14: electrolysis tank
15: anode
16: cathode
23: power supply device
24: control device
25: cathode-side gas-liquid separation device
26: switching valve
27: water supply device
28: electrolyte supply device
29: CO production catalyst supply device
30: carbon dioxide absorption tank
31: bypass line
32: production gas line
33: production gas tank
34: dehumidification tower
35: gas composition detection device
37: solid-liquid separation device
41: anode-side gas-liquid separation device
42: water supply device
43: electrolyte supply device

The invention claimed is:

1. A synthesis gas production system for producing CO and $H_2$ by electrolyzing an aqueous solution containing $CO_2$, comprising:
    an electrolysis device including an anode chamber having an anode, a cathode chamber having a cathode, and a separator membrane separating the anode chamber and the cathode chamber;
    a cathode-side circulation line connected to the cathode chamber to circulate a cathode solution containing $CO_2$;
    a catalyst supply device provided in the cathode-side circulation line to supply a CO production catalyst to the cathode solution; and
    a gas composition detection device configured to measure a ratio between CO and $H_2$ in a production gas produced in the cathode chamber,
    wherein based on a result of the gas composition detection device, at least one of control of a supply amount of the CO production catalyst by the catalyst supply device and control of a voltage applied between the anode and the cathode by the electrolysis device is performed to make a ratio of $H_2$ to CO in the production gas be within a predetermined target range.

2. The synthesis gas production system according to claim 1, further comprising:
    a bypass line provided in parallel with the cathode-side circulation line and having an upstream end and a downstream end connected to the cathode-side circulation line;
    a flow rate control valve configured to control a flow rate of the cathode solution flowing through the bypass line; and
    a solid-liquid separation device provided in the bypass line.

3. The synthesis gas production system according to claim 1, wherein the target range is set to be greater than or equal to 0.25 and less than or equal to 2.5 for a mole ratio of $H_2$ to CO.

4. The synthesis gas production system according to claim 1, wherein the CO production catalyst is supplied to the cathode solution in a state of at least one of powder, aqueous solution, and suspension.

5. The synthesis gas production system according to claim 1, wherein the CO production catalyst includes at least one of a group consisting of Zn, ZnO, $ZnO_2$, $ZnO_3$, $ZnSO_4$, $Zn(NO_3)_2$, $ZnCl_2$, $ZnBr_2$, $ZnI_2$, $Zn(OCOCH_3)_2$, Ag, AgO, $Ag_2O$, $Ag_2O_3$, $AgNO_3$, AgCl, AgBr, $Ag(OCOCH_3)$, Au, AuCl, $AuCl_3$, $H[AuCl_4]$, $AuBr_3$, $H[AuBr_4]$, $Au(OCOCH_3)$, and $Au(OCOCH_3)_3$.

6. The synthesis gas production system according to claim 1, wherein the cathode solution includes at least one of a group consisting of LiOH, NaOH, KOH, $Li_2CO_3$, $Na_2CO_3$, $K_2CO_3$, $LiHCO_3$, $NaHCO_3$, and $KHCO_3$.

7. The synthesis gas production system according to claim 1, further comprising a carbon dioxide absorption tank provided in the cathode-side circulation line and configured to cause gaseous $CO_2$ to contact the cathode solution and to make the cathode solution absorb the $CO_2$.

8. The synthesis gas production system according to claim 1, further comprising a gas-liquid separation device provided in the cathode-side circulation line and configured to separate the production gas and the cathode solution.

9. The synthesis gas production system according to claim 1, further comprising an anode-side circulation line connected to the anode chamber independently of the cathode-side circulation line to circulate an anode solution.

10. A synthesis gas production system for producing CO and $H_2$ by electrolyzing an aqueous solution containing $CO_2$, comprising:
   an electrolysis device including an anode chamber having an anode, a cathode chamber having a cathode, and a separator membrane separating the anode chamber and the cathode chamber;
   a cathode-side circulation line connected to the cathode chamber to circulate a cathode solution containing $CO_2$;
   a catalyst supply device provided in the cathode-side circulation line to supply a CO production catalyst to the cathode solution;
   a gas composition detection device configured to measure a ratio between CO and $H_2$ in a production gas produced in the cathode chamber;
   a bypass line provided in parallel with the cathode-side circulation line and having an upstream end and a downstream end connected to the cathode-side circulation line;
   a flow rate control valve configured to control a flow rate of the cathode solution flowing through the bypass line; and
   a solid-liquid separation device provided in the bypass line,
   wherein based on a result of the gas composition detection device, at least one of control of a supply amount of the CO production catalyst by the catalyst supply device, control of a flow rate of the cathode solution supplied to the solid-liquid separation device by the flow rate control valve, and control of a voltage applied between the anode and the cathode by the electrolysis device is performed to make a ratio of $H_2$ to CO in the production gas be within a predetermined target range.

11. The synthesis gas production system according to claim 10, wherein the target range is set to be greater than or equal to 0.25 and less than or equal to 2.5 for a mole ratio of $H_2$ to CO.

12. The synthesis gas production system according to claim 10, wherein the CO production catalyst is supplied to the cathode solution in a state of at least one of powder, aqueous solution, and suspension.

13. The synthesis gas production system according to claim 10, wherein the CO production catalyst includes at least one of a group consisting of Zn, ZnO, $ZnO_2$, $ZnO_3$, $ZnSO_4$, $Zn(NO_3)_2$, $ZnCl_2$, $ZnBr_2$, $ZnI_2$, $Zn(OCOCH_3)_2$, Ag, AgO, $Ag_2O$, $Ag_2O_3$, $AgNO_3$, AgCl, AgBr, $Ag(OCOCH_3)$, Au, AuCl, $AuCl_3$, $H[AuCl_4]$, $AuBr_3$, $H[AuBr_4]$, $Au(OCOCH_3)$, and $Au(OCOCH_3)_3$.

14. The synthesis gas production system according to claim 10, wherein the cathode solution includes at least one of a group consisting of LiOH, NaOH, KOH, $Li_2CO_3$, $Na_2CO_3$, $K_2CO_3$, $LiHCO_3$, $NaHCO_3$, and $KHCO_3$.

15. The synthesis gas production system according to claim 10, further comprising a carbon dioxide absorption tank provided in the cathode-side circulation line and configured to cause gaseous $CO_2$ to contact the cathode solution and to make the cathode solution absorb the $CO_2$.

16. The synthesis gas production system according to claim 10, further comprising a gas-liquid separation device provided in the cathode-side circulation line and configured to separate the production gas and the cathode solution.

17. The synthesis gas production system according to claim 10, further comprising an anode-side circulation line connected to the anode chamber independently of the cathode-side circulation line to circulate an anode solution.

* * * * *